United States Patent [19]

Bergmann et al.

[11] Patent Number: 5,138,475
[45] Date of Patent: Aug. 11, 1992

[54] DC-COUPLED OPTICAL DATA LINK UTILIZING DIFFERENTIAL TRANSMISSION

[75] Inventors: Ernest E. Bergmann, Borough of Fountain Hill; David A. Snyder, Springfield Twp., Bucks County, both of Pa.

[73] Assignee: AT&T Bell Laboratories, Murray Hill, N.J.

[21] Appl. No.: 499,225

[22] Filed: Mar. 26, 1990

[51] Int. Cl.⁵ .................. H04B 10/24; H04B 10/00
[52] U.S. Cl. ..................... 359/118; 359/152; 359/158; 359/164; 385/14
[58] Field of Search ............. 359/153, 158, 161, 113, 359/143, 152, 154, 164, 173; 385/14; 357/19

[56] References Cited

U.S. PATENT DOCUMENTS

| | | | |
|---|---|---|---|
| 4,052,611 | 10/1977 | Fish | 250/199 |
| 4,330,870 | 5/1982 | Arends | 455/617 |
| 4,338,732 | 6/1983 | Hansel | 455/608 |
| 4,393,518 | 7/1983 | Briley | 359/161 |
| 4,481,678 | 11/1984 | Sakamoto et al. | 359/153 |
| 4,495,655 | 1/1985 | Benson et al. | 359/143 |
| 4,497,068 | 1/1985 | Fischer | 455/608 |
| 4,504,975 | 3/1985 | Jarret et al. | 455/608 |
| 4,569,059 | 2/1986 | Fish | 375/36 |
| 4,703,471 | 10/1987 | Fitelson et al. | 359/152 |
| 4,784,001 | 11/1988 | Gaertner | 359/158 |
| 4,833,668 | 5/1989 | Rowley | 359/153 |
| 4,870,637 | 9/1989 | Follett | 359/158 |
| 4,979,185 | 12/1990 | Bryans | 359/158 |
| 4,989,934 | 2/1991 | Zavracky et al. | 359/152 |

FOREIGN PATENT DOCUMENTS 0234432  10/1987  Japan ............................ 359/113

OTHER PUBLICATIONS

Bar-Chaim, "Integrated Optoelectronics", IEEE Spectrum, May 1982, pp. 37–45.
"12-channel PIN and LED arrays...", Y. Ota et al. Proc. SPIE, vol. 839, pp. 143–147, 1987.
"GaInAsP Distributed Feedback Laser Array", Y. Twu et al., Elec. Lett, vol. 24, No. 12, Jun. 1988, pp. 743–744.

Primary Examiner—Edward L. Coles, Sr.
Assistant Examiner—Knife-Michael Negash
Attorney, Agent, or Firm—Wendy W. Koba

[57] ABSTRACT

A data link is disclosed which utilizes differential communication between pairs of transmitting and receiving devices. In particular, one device of each pair is reserved for communicating a logic "0" and the other is reserved for communicating a logic "1". The pairs are grouped to form an array which is capable of providing simultaneous parallel communication, at relatively low bit rates, between two equipment components. The communication may be either unidirectional or bidirectional between the components. The ability to integrate the arrays of transmitting and/or receiving electronics and optics allows for improved reliability of the inventive system over a single fiber, high data rate, alternative.

42 Claims, 6 Drawing Sheets

DC-COUPLED OPTICAL DATA LINK UTILIZING DIFFERENTIAL TRANSMISSION

BACKGROUND OF THE INVENTION

1. Field of the Invention

The present invention relates to a DC-coupled optical data link utilizing differential transmission and, more particularly, to a system which utilizes an array of paired transmitting devices and an array of paired receiving devices to achieve communication, with one device of each pair dedicated to transmission of a logic "0" and the other dedicated to transmission of a logic "1".

2. Description of the Prior Art

There is a growing need to be able to optically interconnect backplanes of computers and communication equipment over relatively short distances (10-100 meters, for example). Current applications consist primarily of massive parallel data interfaces (typically 32-64 lines) with parallel clocking rates (typically 20-50 MHz). The aggregate data bandwidth, therefore, is within the range of 0.5-4.0 Gb/s. Although there exist many optical systems which are capable of handling this bandwidth with a single fiber interconnection, the cost, size, complexity and power requirements of such interconnections are considered to be overwhelming for many low cost applications.

SUMMARY OF THE INVENTION

The need remaining in the prior art is addressed by the present invention which relates to a DC-coupled optical data link utilizing differential transmission and, more particularly, to a system which utilizes an array of paired transmitting devices and an array of paired receiving devices, coupled together by an array of paired optical signal paths, to provide transmission suitable for optical backplane applications.

In accordance with one embodiment of the present invention, a pair of transmitting devices are used to transmit a given data stream, with the first device being activated to transmit a logic "1" and the second device being activated to transmit a logic "0". Similarly, a pair of receiving devices are used to recover the data stream, where the data is recovered by comparing the photocurrent outputs from the pair of devices. Advantageously, an array of 2N transmitting devices, coupled in pairs to a set of data inputs may be used to form a set of N data channels for simultaneously transmitting N separate data streams. It is to be understood that individual data signals may be multiplexed together to form a single data stream so that the array system of the present invention is actually capable of transmitting MxN signals, where M is number of data signals/stream.

In another embodiment of the present invention, bidirectional communication is achieved by utilizing the semiconductor devices at each end of the data channel as both transmit and receive devices. Accordingly, transmit and receive circuitry is then located at each end of the channel.

Further, amplification of the transmitted signal may be obtained, in another embodiment of the present invention, by using a laser gain medium, for example, a laser amplifier, coupled to each pair of waveguides. Since the gain medium will preferentially amplify the transmitted data signal with respect to any background noise present along the inactive waveguide, the amplifier also serves as a filter to the communication system.

An advantage of the present invention is that by utilizing pairs of transmitters, optical paths and receivers to transmit data, the relative DC level of the pair of signals is unchanging (i.e., fixed at zero), allowing relatively simple emitter-coupled logic (ECL) transmitter and receiver circuits to be used.

An additional advantage may be realized in one embodiment of the present invention where integrated arrays of transmitter and receiver optical devices are used. Integration provides for inherent matching of components, resulting in substantially equal power being emitted from the transmitting devices, and substantially equal photocurrents being developed by the receiving devices. The use of integrated arrays will provide further advantages to the system in terms of interdevice tracking as a function of, for example, temperature, age or alignment. The match inherent in optical devices allows for further simplification in the electronic circuitry.

For one particular embodiment of the present invention, the need to provide special signal encoding for the purpose of clock recovery may be eliminated by reserving one pair of lines for transmission of a system clock. Therefore, for a conventional fiber ribbon cable of twelve (or eighteen) individual fibers, one clock signal and five (or eight) data streams (each stream having one or more separate data signals) may be simultaneously transmitted.

Other and further advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
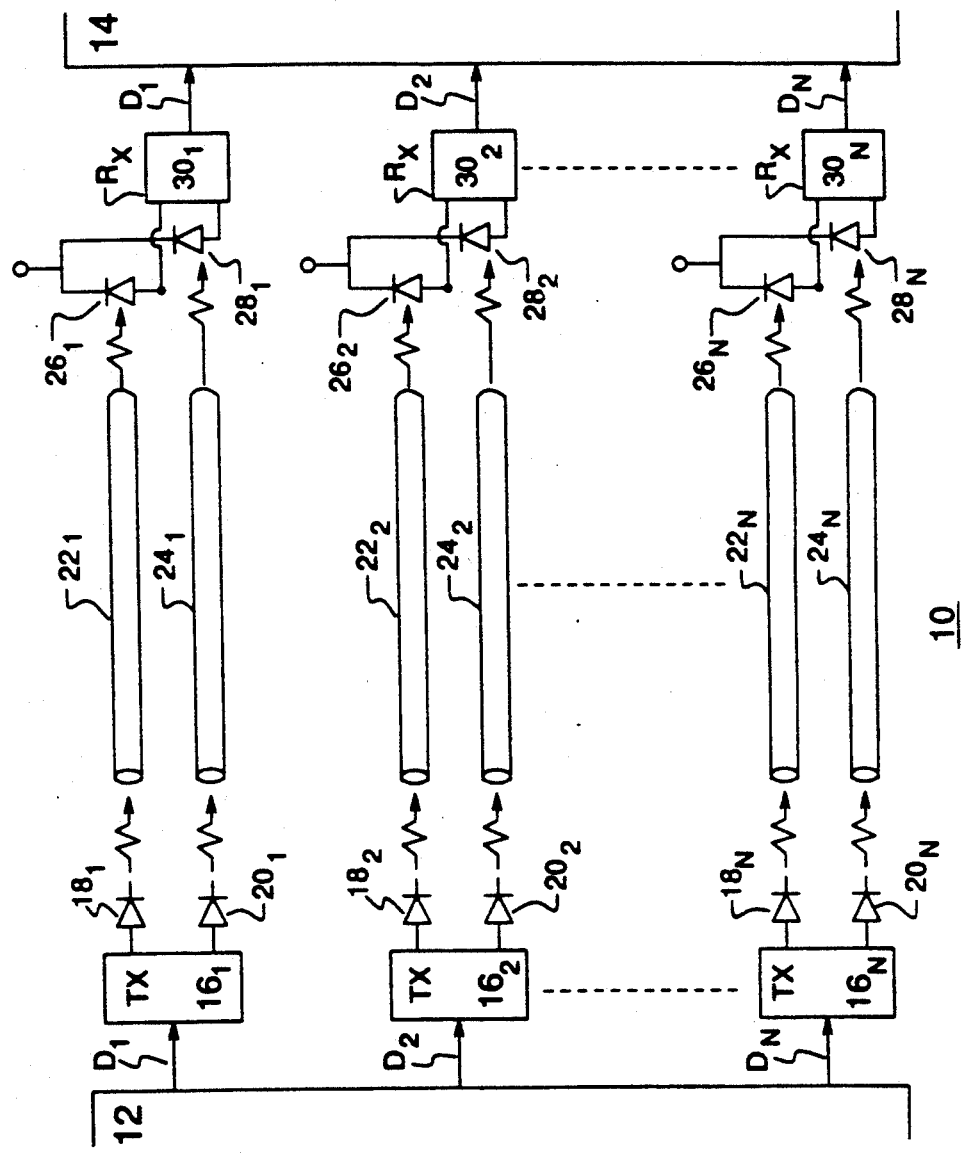
FIG. 1 illustrates an exemplary differential array optical data link formed in accordance with the present invention.

An exemplary differential array optical data link 10 of the present invention is illustrated in FIG. 1. As discussed above and shown in FIG. 1, such a data link may advantageously be utilized as an optical backplane interconnect between a first equipment component 12 (for example, a personal computer) and a second equipment component 14 (for example, a mass storage device or cache memory device). In accordance with the present invention, each data channel is associated with two distinguishable (e.g., separate polarizations or separate fibers) optical signal paths, one path for transmitting a logic "0" and the other for transmitting a logic "1". For the remainder of the present discussion, the optical signal path will be discussed in terms of an optical fiber. However, it is to be understood that the present invention is not limited to utilizing optical fibers as the optical transmission media.

Referring to FIG. 1, a first data stream $D_1$ is applied as an input to a first transmitter $16_1$, the output of transmitter $16_1$ being coupled to a pair of light emitting devices $18_1$, $20_1$, where devices $18_1$, $20_1$ may be lasers or LEDs. An exemplary transmitter $16_i$ will be discussed in detail below in association with FIG. 6. In general, transmitter $16_1$ is configured to activate device $18_1$ to transmit a logic "0" and activate device $20_1$ to transmit a logic "1". As shown device $18_1$ is coupled to the near end of optical fiber $22_1$ and device $20_1$ is coupled to the near end of fiber $24_1$. The far ends of fibers $22_1$ and $24_1$ are coupled to a pair of optical devices $26_1$ and $28_1$, respectively, where devices $26_1$, $28_1$ may comprise PIN or avalanche photodiodes, or any other suitable optical receiving devices. The electrical output signals from devices $26_1$, $28_1$ are applied as inputs to a receiver $30_1$ which recovers the transmitted data stream $D_1$. Receiving devices $26_1$, $28_1$ may be considered as forming part of a receiver circuit $30_1$, where an exemplary receiver $30_i$ will be discussed in detail below in association with FIG. 7.

As discussed above, the system of the present invention is particularly advantageous for array applications with multiple LED (or laser) and PIN arrays (or alternatively, arrays of other transmitting and or receiving devices). Referring to FIG. 1, additional data streams $D_2, \ldots, D_N$ are illustrated as applied to the inputs of transmitters $16_2, \ldots, 16_N$. Devices $18_2, 20_2$ through $18_N, 20_N$ are then activated in accordance with the data streams and the light outputs are propagated along fibers $22_2, 24_2$ through $22_N, 24_N$ to receivers $30_2$-$30_N$. In association with such an array application, there exist many techniques for forming large arrays of semiconductor optical devices on a single substrate. For example, an article entitled "GaInAsP distributed feedback laser array" by Y. Twu et al. appearing in *Electronic Letters*, Vol. 24, No. 2, June 1988 at pp. 143–7. discusses a particular fabrication technique suitable for laser array applications. Fabrications techniques for LED and PIN arrays are described in an article entitled "12-channel PIn and LED arrays and their packaging for 1.3 μm applications", by Y. Ota et al., appearing in *Proceedings SPIE*, Vol. 839, 1988 at pp. 143–7. Since a monolithic array of optical devices will have been subject to identical processing sequences, the devices will contain essentially identical performance characteristics (in terms of temperature tracking, aging, alignment, etc.).

For embodiments utilizing fiber as the interconnecting signal paths, the preferred embodiment with present technology would consist of a conventional twelve (or eighteen) fiber ribbon cable. Therefore, the embodiment would include a set of six (or nine) physical data channels. By using various multiplexing schemes, the number of data signals transmitted over each channel may be increased. In this case, the transmission of a frame clock becomes a requirement and one of the six (nine) channels may be reserved for this purpose. Thus, the five (eight) remaining data channels may be multiplexed to carry M separate separate data signals (where M may vary from channel to channel).

Figure 2:
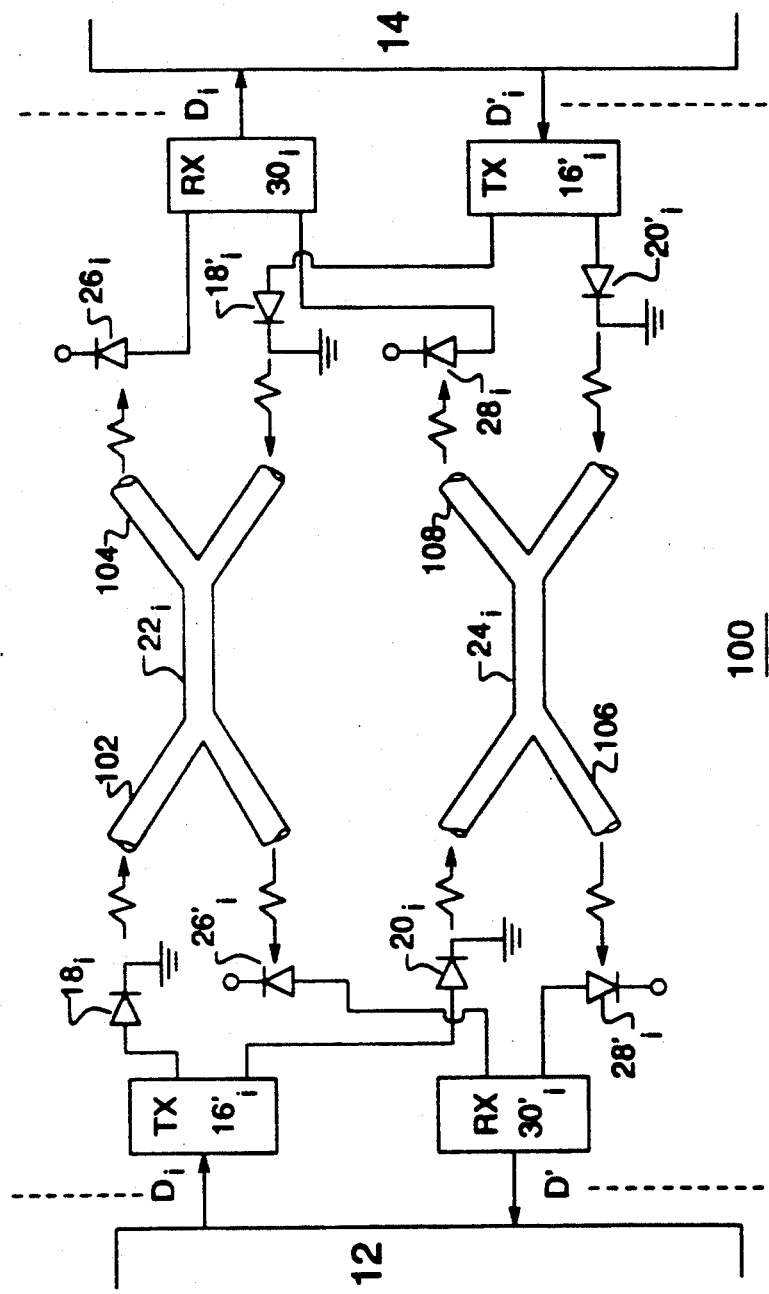
FIG. 2 illustrates an alternative differential array optical data link capable of providing bidirectional transmission in accordance with the present invention.

A differential data link of the present invention may also be configured as a bidirectional communication system. An exemplary bidirectional differential data link 100 is illustrated in FIG. 2. Similar to the arrangement of FIG. 1, link 100 is utilized to provide communication between first equipment component 12 and second equipment component 14 over a plurality of N data channels, each channel comprising a pair of optical fibers $22_i$, $24_i$. For the sake of clarity, only the "ith" channel is illustrated in FIG. 2. It is to be understood that in implementation, bidirectional data link 100, like data link 10 of FIG. 1, comprises a plurality of N data channels, each constructed in a manner similar to that shown in FIG. 2. In accordance with the present invention, bidirectional communication is achieved by including optical transmitting and receiving devices with both components 12 and 14. In particular, a second pair of transmitting devices $18'_i$, $20'_i$ are co-located with receiving devices $26_i$, $28_i$ at component 14. Similarly, a second pair of receiving devices $26'_i$, $28'_i$ are co-located with transmitting devices $18_i$, $20_i$ at component 12.

In operation of bidirectional data link 100, communication from equipment component 12 to equipment component 14 occurs as discussed above with the embodiment of FIG. 1. In the reverse direction, a data signal $D'_i$ from equipment component 14 is applied as an input to differential transmitter circuit $16'_i$. The pair of outputs from circuit $16'_i$ are then applied as inputs to transmitting devices $18'_i$, $20'_i$ for propagation over the "ith" communication channel (via fibers $22_i$, $24_i$) to equipment component 12. At component 12, the received signal is coupled to the pair of receiving devices $26'_i$, $30'_i$ for conversion into an electrical signal. The pair of electrical outputs are then applied as inputs to differential receiver circuit $30'_i$ to recover the transmitted data signal $D'_i$, which is subsequently applied as an input to equipment component 12. In order to accomplish the actual coupling of the optical signals to the optical devices, it is seen that fiber $22_i$ is modified to include a first splitter 102 at component 12 and a second splitter 104 at component 14. Similarly, fiber $24_i$ is modified to include a first splitter 106 at component 12 and a second splitter 108 at component 14. In particular, splitter 102 couples transmitting device $18_i$ and receiving device $26'_i$ to fiber $22_i$, and splitter 104 couples receiving device $26_i$ and transmitting device $18'_i$ to fiber $22_i$. Splitters 106, 108 provide a similar function with respect to devices $20_i$, $28'_i$, $28_i$, $20'_i$ and fiber $24_i$.

Figure 3:
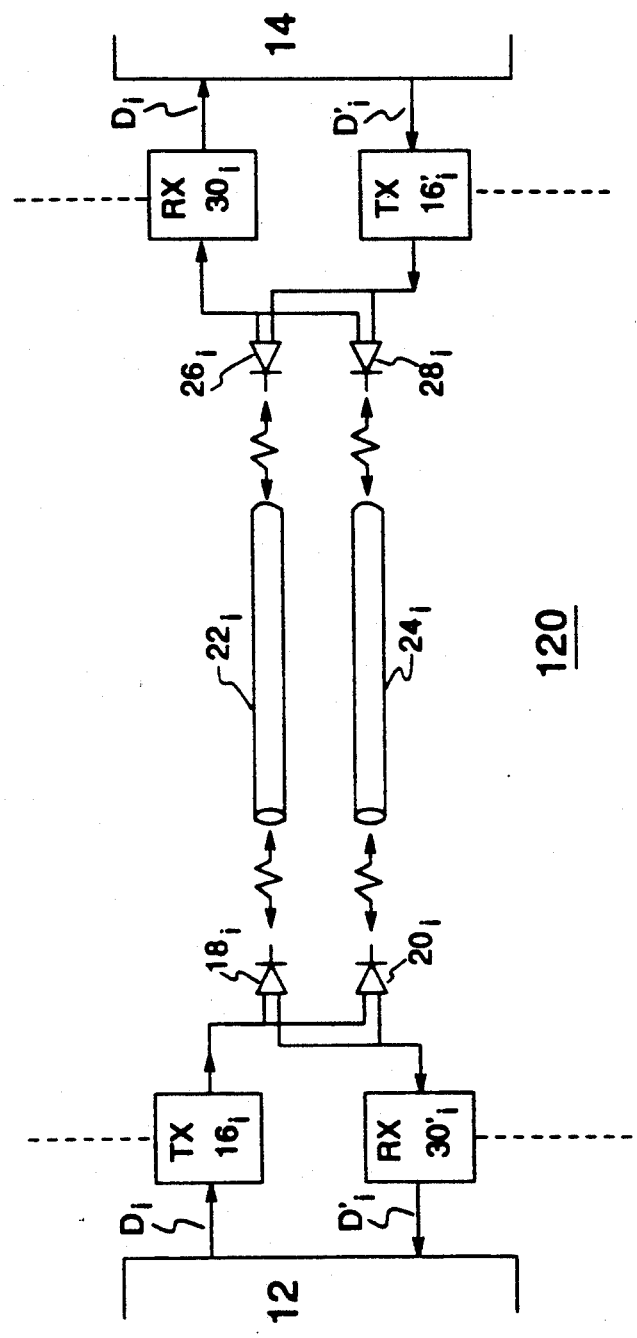
FIG. 3 illustrates yet another bidirectional array optical data link, utilizing same semiconductor optical devices for both transmission and reception.

As shown, the arrangement of FIG. 2 is capable of providing full duplex, bidirectional communication between equipment components 12 and 14. In certain circumstances, it may be desirable to reduce the number of active devices associated with either equipment component, while still providing bidirectional communication. In this case, a half duplex arrangement 120, as illustrated in FIG. 3, may be the preferred alternative. In this particular embodiment, the same pair of devices, for example, devices $18_i$, $20_i$ at the near end and $26_i$, $28_i$ at the far end, are used as both transmitting and receiving devices. It is well-known in the art that an LED may behave as either a light emitter or light receptor, depending upon the bias applied thereto. Thus, arrays of LEDs may be used in this particular embodiment to provide bidirectional communication. As with the arrangement of FIG. 2, additional circuitry is required to effect bidirectional communication. In particular, a transmitter circuit 16′$_i$ is co-located with receiver circuit 30$_i$ at component 14 to provide the return data signal D′$_i$ to devices 26$_i$, 28$_i$. Similarly, a receiver circuit 30′$_i$ is co-located with transmitter circuit 16$_i$ at component 12 to receive electrical output from devices 18$_i$, 20$_i$ and enable recovery of the transmitted return signal D′$_i$. Advantageously, the co-located transmitter and receiver circuitry may be integrated on a single substrate to decrease the overall size of the data link.

For the particular embodiment 120 of FIG. 3, it becomes important to provide a means for controlling the direction of signal flow during a given period of time. One method of providing this control is to dedicate one channel to the transmission of a system clock. A system clock would allow, for example, component 12 to transmit during only a first designated time period $\tau_1$, and component 14 to transmit during only a second designated time period $\tau_2$. It is to be understood that there exist many other means of controlling the communication of information between the two equipment components 12 and 14.

An advantage of the present invention is the use of differential transmission in the form of a pair of paths used to form a single data channel. Differential transmission allows for the receiver circuitry to be formed with differential logic, with the threshold level set at zero. Simply, a receiver 30$_i$ (30′$_i$) merely compares the photocurrent outputs from devices 26$_i$, 28$_i$ (18$_i$, 20$_i$) and forms the recovered data signal by determining which device produces the largest signal. In particular, if the output from device 26$_i$ (18$_i$) is greater, the recovered bit is defined as a logic "0". Alternatively, of the output from device 28$_i$ (20$_i$) is greater, the recovered bit is defined as a logic "1".

Figure 4:
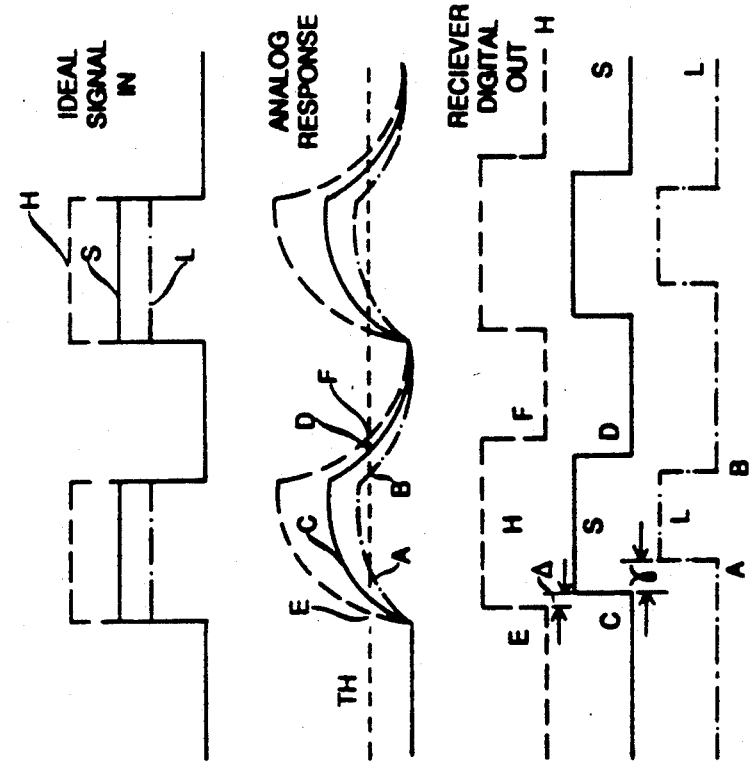
FIG. 4 contains a graph illustrating the presence of pulse width distortion in conventional optical transmissions.

The use of such a differential recovery arrangement allows the inventive system to be essentially immune to pulse width distortion at the receiver input. Pulse width distortion is a problem in conventional systems which use a single fiber to transmit both logic signals. FIG. 4 is illustrative of the pulse width distortion problem. In a conventional receiver, a fixed threshold DC level TH is used to determine which logic bit has been received. FIG. 4 illustrates three different signal power levels, indicated by the appropriate letters L (low), S (standard) and H (high). For low received signal power, various factors, including RC time constants related to the receiver electronics, fiber dispersion, and transmitter rise/fall times, result in the transition from logic "0" to logic "1" to occur at point A, and the transition back to logic "0" at point B. The resultant output pulse from the receiver is also illustrated. For standard signal levels, the transitions are seen to occur at points C and D, and the output pulse is of the shape illustrated below the received signals. When the receiver is overdriven and the signal power exceeds the specified value, the transitions are shown to occur at points E and F, with the resulting output data signal as shown. Clearly, pulse width distortion will be present in this system, as indicated by Δ and γ in FIG. 4. In other conventional receiver designs, an "automatic threshold" setting may be utilized which continuously adjusts to the received signal power level. However, this particular type of receiver is known to fail in the absence of both "1"'s and "0"'s (or during long runs of either "1"'s or "0"'s).

Figure 5:
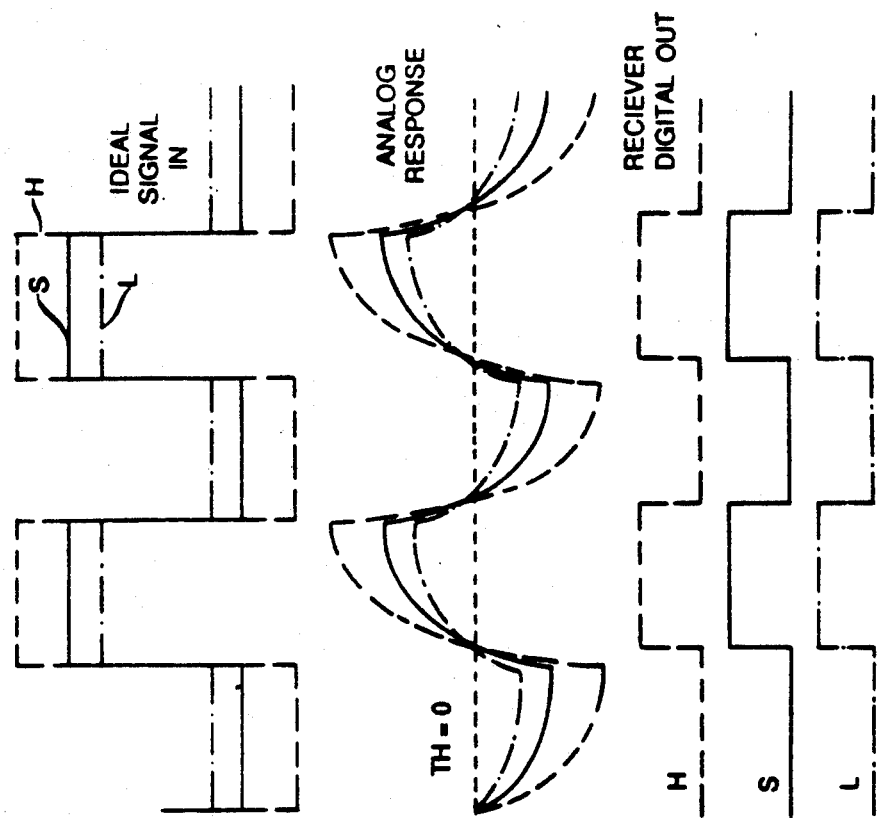
FIG. 5 contains a graph illustrating the elimination of pulse width distortion in the differential signaling scheme of the present invention.

The use of differential signaling in accordance with the present invention will essentially eliminate these problems, as shown in FIG. 5. In this case, the threshold TH of the receiver is set to provide equal channel current levels so that a differential DC level of zero is achieved. The transitions between logic "1" to logic "0" are therefore determined only by the zero crossings of the received signal. For the same three signal power levels L, S and H, it is shown in FIG. 5 that the zero-crossing is independent of the received signal power. Therefore, the recovered data signal from the differential receiver will be essentially independent of the strength of the received signal.

Figure 6:
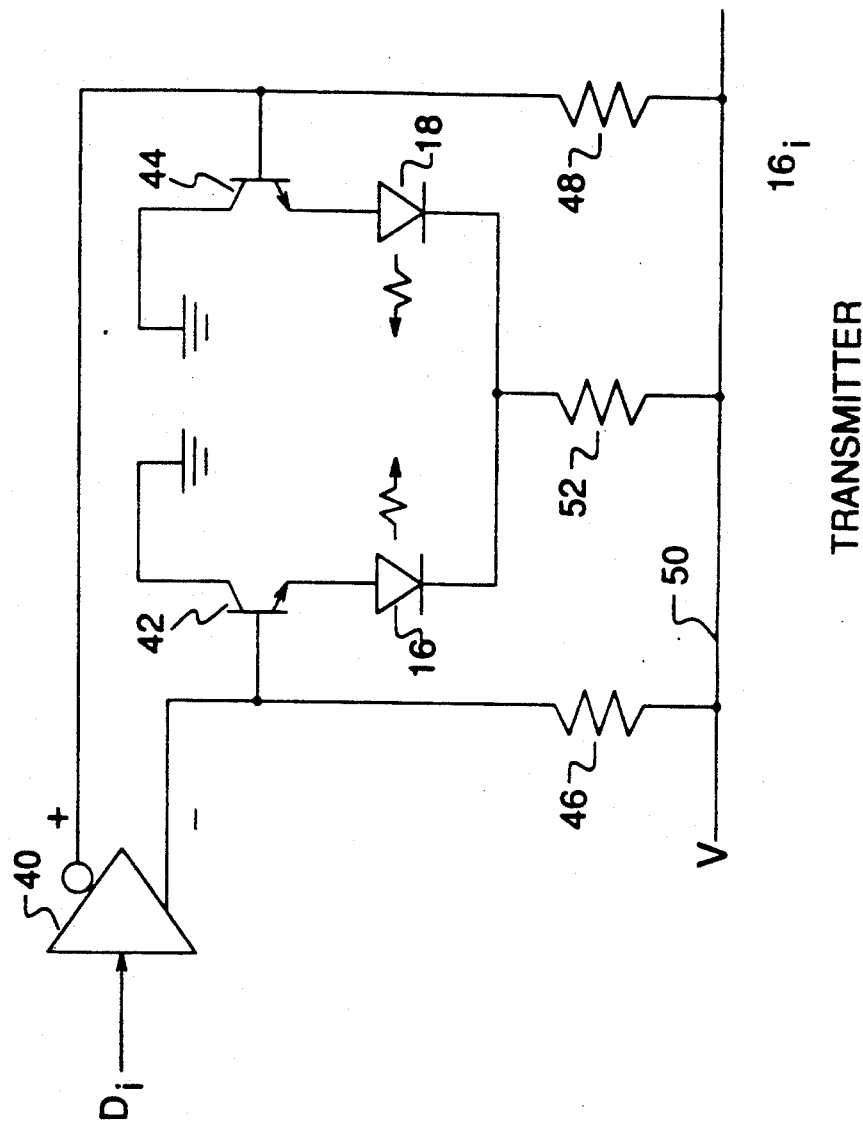
FIG. 6 illustrates an exemplary ECL transmitter which may be used in the system of the present invention.

An exemplary transmitter circuit is illustrated in FIG. 6. The differential design exploits the inherent matching of devices 16 and 18, as discussed above, to provide equal emitted power, minimum noise injection. As shown, data signal D$_i$ is applied as the input to amplifier 40, where amplifier 40 is configured to provide a pair of output signals of opposite value (referred to as non-inverting and inverting outputs). The non-inverting output is applied to the base of a first transistor 42, the collector of transistor 42 being grounded. The inverting output from amplifier 40 is applied as the input to the base of a second transistor 44, where the collector of transistor 44 is also grounded. The bases of transistors 42,44 are coupled through resistors 46,48 to a power supply rail 50. Emitters of transistors 42,44 are coupled to LEDs 16 and 18, respectively, where LEDS 16,18 are also coupled through resistors 52 to power supply rail 50. In operation, when data signal D$_i$ is a logic "1", transistor 42 will be turned on and activate LED 16. Alternatively, when a logic "0" is present, the inverting output from amplifier 40 will go high and turn on transistor 44. In turn, the activation of transistor 44 will cause LED 18 to emit light.

Figure 7:
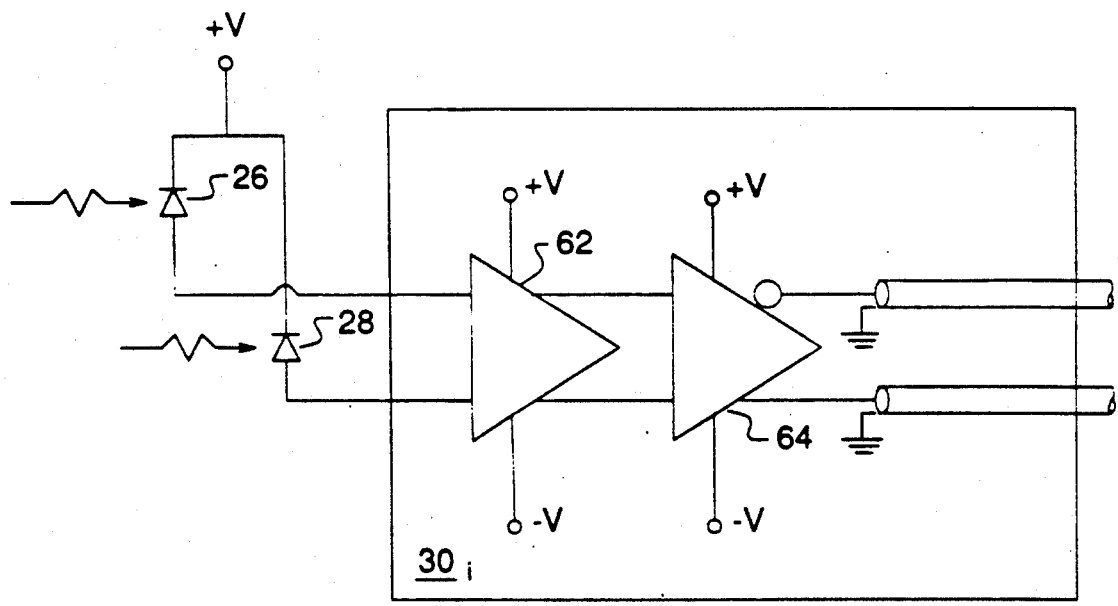
FIG. 7 illustrates an exemplary ECL receiver which may be used in the system of the present invention.

An exemplary receiver 30$_i$ is illustrated in FIG. 7, in combination with photodiodes 26,28. Receiver 30$_i$ contains a differential amplifier 62, where photodiode 26 is coupled to an inverting input of amplifier 62 and photodiode 28 is coupled to the noninverting input of amplifier 62. The complementary outputs from amplifier 62 are coupled to the inputs of a comparator 66. Since differential signaling is used, the DC level of the input to comparator 66 is maintained at a relative DC zero level, allowing the amplifiers to be directly connected to comparator 66 without any capacitive interconnection. Comparator 66 maintains a constant threshold TH, as discussed in association with FIG. 5, and provides the recovered data signal as a function of the input of the greatest magnitude.

Advantageously, the transmitter circuit of FIG. 6 may be replicated for each data channel and integrated as a single monolithic unit. Similarly, the receiver circuit of FIG. 7 may be replicated and integrated. The resultant array communication, when used with an optical fiber ribbon cable, enjoys the maximum benefits of matching the optical and electrical characteristics of each data channel.

We claim:

1. A differential array data link comprising
a plurality of 2N N being an integer greater than 1 transmitting devices grouped in pairs such that a first device of each pair is activated to transmit a logic "0" and a second device of each pair is activated to transmit a logic "1";
a plurality of 2N receiving devices grouped into pairs such that an output signal from a first device of each pair indicates the reception of a logic "0" and an output signal from a second device indicates the reception of a logic "1"; and a plurality of 2N signal paths for coupling the plurality of 2N transmitting devices to the plurality of 2N receiving devices in a one-to-one manner, wherein the plurality of grouped pairs are defined as forming a plurality of N data channels.

2. A differential array data link as defined in claim 1 wherein each data channel further comprises differential transmitting circuit means responsive to an incoming data stream for providing an output to the first transmitting device for a logic "0" and an output to the second device for a logic "1"; and differential receiving circuit means coupled to the associated pair of receiving devices for providing an output data bit of logic "0" when output from first receiving device is greater than the output from the second receiving device and providing an output data bit of logic "1" when the output from the second receiving device is greater than the output from the first receiving device.

3. A differential array data link as defined in claim 2 wherein the differential transmitting circuit means from each data channel are integrated to form a monolithic transmitting circuit.

4. A differential array data link as defined in claims 2 or 3 wherein the differential receiving circuit means from each data channel are integrated to form a monolithic receiving circuit.

5. A differential array data link as defined in claims 1 or 2 wherein each data channel includes multiplexing and demultiplexing means for transmitting a plurality of M separate data signals along the data channel.

6. A differential array data link as defined in claim 5 wherein one data channel is reserved for the transmission of a frame clock so as to control the multiplexing and demultiplexing operations.

7. A differential array data link as defined in claim 1 wherein the plurality of 2N transmitting devices comprises a plurality of 2N LEDs.

8. A differential array data link as defined in claim 7 wherein the plurality of 2N LEDs are integrated to form a monolithic structure.

9. A differential array data link as defined in claim 1 wherein the plurality of 2N transmitting devices comprises a plurality of 2N lasers.

10. A differential array data link as defined in claim 9 wherein the plurality of 2N lasers are integrated to form a monolithic structure.

11. A differential array data link as defined in claim 1 wherein the plurality of 2N receiving devices comprises a plurality of 2N photodiodes.

12. A differential array data link as defined in claim 1 wherein the plurality of 2N photodiodes are integrated to form a monolithic structure.

13. A differential array data link as defined in claim 1 wherein at least one signal path comprises an optical fiber.

14. A differential array data link as defined in claim 13 wherein each signal path comprises an optical fiber.

15. A differential array data link as defined in claim 14 wherein the plurality of 2N fiber signal paths are formed to comprise at least one fiber ribbon cable.

16. A bidirectional differential array optical data link comprising a first plurality of 2N N being an integer greater than 1 semiconductor optical devices grouped in pairs such that a first device of each pair is activated to communicate a logic "0" and a second device of each pair is activated to communicate a logic "1";

a second plurality of 2N semiconductor optical devices grouped in pairs such that a first device of each pair is activated to communicate a logic "0" and a second device of each pair is activated to communicate a logic "1"; and a plurality of 2N signal paths for coupling the first plurality of 2N semiconductor optical devices to the second plurality of 2N semiconductor optical devices in a one-to-one manner, wherein the plurality of grouped pairs are defined as forming a plurality of N bidirectional data channels.

17. A bidirectional differential array optical data link as defined in claim 16 wherein each bidirectional data channel further comprises first differential transmitting circuit means coupled to a pair of optical devices of the first plurality of 2N semiconductor optical devices, for providing an output to the first device of said pair for a logic "0" and an output to the second device for a logic "1";

second differential transmitting circuit means coupled to a pair of optical devices of the second plurality of 2N semiconductor optical devices, for providing an output to the first device of said pair for a logic '0' and an output to the second device for a logic '1';

first differential receiving circuit means coupled to the pair of devices from said first plurality of 2N semiconductor optical devices for providing an output data bit of logic "0" when the output from the first device is greater than the output from the second device and providing an output data bit of logic "1" when the output from the second device is greater than the output from the first device and;

second differential receiving circuit means coupled to the pair of devices from said second plurality of 2N semiconductor optical devices for providing an output data bit of logic '0' when the output from the first device is greater than the output from the second device and providing an output data bit of logic '1' when the output from the second device is greater than the output from the first device, the first differential transmitting circuit means and the first differential receiving circuit means being co-located at a first end of the data channel, and the second differential transmitting circuit means and the second differential receiving circuit means being co-located at a second, opposite end of said data channel.

18. A bidirectional differential array optical data link as defined in claim 17 wherein for each data channel the co-located differential transmitting and receiving circuit means are integrated to form a monolithic unit, wherein the bidirectional data link array includes a first plurality of N monolithic units associated with the first plurality of 2N semiconductor optical devices and a second plurality of N monolithic units associated with the second plurality of 2N semiconductor optical devices.

19. A bidirectional differential array optical data link as defined in claim 18 wherein
the first plurality of N monolithic units are integrated to form a single structure; and
the second plurality of N monolithic units are integrated to form a single structure.

20. A bidirectional differential array optical data link as defined in claim 17 wherein the data link further comprises
means for controlling the flow of data between the first plurality of 2N semiconductor optical devices and the second plurality of 2N semiconductor optical devices.

21. A bidirectional differential array optical data link as defined in claim 20 wherein the controlling means provides for the first plurality of 2N semiconductor optical devices to transmit and the second plurality of 2N semiconductor optical devices to receive during a first predetermined time period $\tau_1$, and for the second plurality of 2N semiconductor optical devices to transmit and the first plurality of 2N semiconductor optical devices to receive during a second predetermined time period $\tau_2$.

22. A bidirectional differential array optical data link as defined in claim 20 wherein the controlling means includes one data channel reserved for the transmission of a frame clock to control the transmission between the pluralities of 2N semiconductor optical devices.

23. A bidirectional differential array optical data link as defined in claim 16 wherein the first and second pluralities of 2N semiconductor optical devices each comprise LEDs.

24. A bidirectional differential array optical data link as defined in claim 23 wherein the first plurality of 2N LEDs are integrated to form a first monolithic structure and the second plurality of 2N LEDs are integrated to form a second monolithic structure.

25. A bidirectional differential array optical data link as defined in claim 16 wherein the first and second pluralities of 2N semiconductor optical devices each comprise a semiconductor laser.

26. A bidirectional differential array optical data link as defined in claim 25 wherein the first plurality of 2N lasers are integrated to form a first monolithic structure and the second plurality of 2N lasers are integrated to form a second monolithic structure.

27. A bidirectional differential array optical data link as defined in claim 16 wherein at least one signal path comprises an optical fiber.

28. A bidirectional differential array optical data link as defined in claim 27 wherein each signal path comprises an optical fiber.

29. A bidirectional differential array optical data link as defined in claim 28 wherein the plurality of 2N fiber signal paths are formed to comprise at least one fiber ribbon cable.

30. A bidirectional differential array optical data link comprising
a first plurality of 2N N being an integer greater than 1 transmitting devices grouped in pairs such that a first device of each pair is activated to transmit a logic "0" and a second device of each pair is activated to transmit a logic "1";
a first plurality of 2N receiving devices grouped in pairs such that an output signal from a first device indicates reception of a logic "0" and an output signal from a second device indicates reception of a logic "1";
a second plurality of 2N transmitting devices, co-located with the first plurality of 2N receiving devices and grouped in pairs such that a first device of each pair is activated to transmit a logic "0" and a second device of each pair is activated to transmit a logic "1";
a second plurality of 2N receiving devices, co-located with the first plurality of transmitting devices and grouped in pairs such that an output signal from a first device indicates reception of a logic "0" and an output signal from a second device indicates reception of a logic "1"; and
a plurality of 2N signal paths for coupling the co-located first plurality of 2N transmitting devices and second plurality of 2N receiving devices to the co-located first plurality of 2N receiving devices and second plurality of 2N transmitting devices, the signal paths grouped into pairs to form, with the coupled devices, a plurality of N bidirectional data channels.

31. A bidirectional differential array optical data link as defined in claim 30 wherein each bidirectional data channel further comprises
first differential transmitting circuit means coupled to a pair of optical transmitting devices of the first plurality of 2N transmitting devices for providing an output to the first device of said pair for transmission of a logic "0" and an output to the second device for transmission of a logic "1";
second differential transmitting circuit means coupled to a pair of optical transmitting device of the second plurality of 2N transmitting devices for providing an output to the first device of said pair for transmission of a logic '0' and an output to the second device for transmission of a logic '1';
first differential receiving circuit means coupled to a pair of optical receiving devices of the first plurality of 2N receiving devices for providing an output data bit of logic "0" when the output from the first device is greater than the output from the second device, and providing an output data bit of logic "1" when the output from the second device is greater than the output from the first device; and
second differential receiving circuit means coupled to a pair of optical receiving devices of the second plurality of 2N receiving devices for providing an output data bit of logic '0' when the output from the first device is greater than the output from the second device, and providing an output data bit of logic '1' when the output from the second device is greater than the output from the first device,
the first differential transmitting circuit means and the first differential receiving circuit means being co-located at a first end of the data channel, and the second differential transmitting circuit means and the second differential receiving circuit means being co-located at a second, opposite end of said data channel.

32. A bidirectional differential array optical data link as defined in claim 31 wherein for each data channel
the co-located differential transmitting and receiving circuit means are integrated to form a monolithic unit, wherein the bidirectional data link array includes a first plurality of N monolithic units associated with the first plurality of 2N transmitting devices and the second plurality of 2N receiving devices, and a second plurality of N monolithic units associated with the first plurality of 2N receiving devices and the second plurality of 2N transmitting devices.

33. A bidirectional differential array optical data link as defined in claim 32 wherein
the first plurality of N monolithic units are integrated to form a single structure; and
the second plurality of N monolithic units are integrated to form a single structure.

34. A bidirectional differential array optical data link as defined in claim 30 wherein the first and second pluralities of 2N transmitting devices each comprise LEDs.

35. A bidirectional differential array optical data link as defined in claim 34 wherein each plurality of 2N LEDs is integrated to form an LED array.

36. A bidirectional differential array optical data link as defined in claim 30 wherein the first and second pluralities of 2N transmitting devices each comprise lasers.

37. A bidirectional differential array optical data link as defined in claim 36 wherein each plurality of 2N lasers is integrated to form a laser array.

38. A bidirectional differential array optical data link as defined in claim 30 wherein the first and second pluralities of 2N receiving devices each comprise photodiodes.

39. A bidirectional differential array optical data link as defined in claim 38 wherein each plurality of 2N photodiodes is integrated to form a photodiode array.

40. A bidirectional differential array optical data link as defined in claim 30 wherein at least one signal path comprises an optical fiber.

41. A bidirectional differential array optical data link as defined in claim 40 wherein each signal path comprises an optical fiber.

42. A bidirectional differential array optical data link as defined in claim 41 wherein each fiber comprises
a first splitter for coupling to the associated devices from the first transmitting and second receiving pluralities of devices; and
a second splitter for coupling to the associated devices from the second transmitting and first receiving pluralities of devices.

* * * * *